US005765275A

United States Patent [19]
Obara

[11] Patent Number: 5,765,275
[45] Date of Patent: Jun. 16, 1998

[54] METHOD OF MANUFACTURING HARD DISK DRIVE UNIT

[75] Inventor: Rikuro Obara, Nagano-ken, Japan

[73] Assignee: Minebea Kabushiki-Kaisha, Nagano-ken, Japan

[21] Appl. No.: 588,167

[22] Filed: Jan. 18, 1996

[51] Int. Cl.$^6$ .................. G11B 5/10; G11B 33/02
[52] U.S. Cl. .................. 29/603.03; 29/DIG. 47; 360/97.01; 360/105
[58] Field of Search ............. 29/603.03, 34 R, 29/898.054, 527.6, 527.7, DIG. 47; 360/97.01, 97.02, 105

[56] References Cited

U.S. PATENT DOCUMENTS

| | | | |
|---|---|---|---|
| 4,599,666 | 7/1986 | Liu et al. | 360/97.01 X |
| 4,875,276 | 10/1989 | Yunokuchi et al. | 29/603.03 |
| 4,887,179 | 12/1989 | Coe | 29/34 R X |
| 4,894,735 | 1/1990 | Takahashi et al. | 360/97.01 |
| 5,309,624 | 5/1994 | Nishikawa | 29/603.03 |
| 5,309,628 | 5/1994 | Fukuchi et al. | 29/603.03 X |
| 5,551,145 | 9/1996 | Jurgeson | 29/603.03 |
| 5,602,700 | 2/1997 | Viskochil et al. | 360/105 |
| 5,624,584 | 4/1997 | Koriyama et al. | 29/603.03 X |

FOREIGN PATENT DOCUMENTS

| 4140720 | 6/1993 | Germany | 29/DIG. 47 |
|---|---|---|---|

*Primary Examiner*—Peter Vo
*Attorney, Agent, or Firm*—Lowe, Price, LeBlanc & Becker

[57] ABSTRACT

The drive unit is improved in precision while the number of its manufacturing steps is a minimum. The drive unit reduces its manufacturing cost, and comprises a base plate 1 assuming a predetermined shape in cross-section so as to form a pair of frame portions 2 in its opposite sides. The plate 1 is made of metal, formed by using an extrusion process, and provided with: a concave portion 4 with a central hole 3a through which a motor M is mounted on the plate 1; and, a mounting hole 3c through which a swing arm is mounted on the plate 1. The motor M has its spindle 5 mounted in the central hole 3a of the plate 1 in an insertion manner. The swing arm 6 has its base portion supported by a pivot 8 through a pair of ball bearings 7. The pivot 8 is mounted on the plate 1 through the mounting hole 3c in an insertion manner.

5 Claims, 5 Drawing Sheets

METHOD OF MANUFACTURING HARD DISK DRIVE UNIT

BACKGROUND OF THE INVENTION

1. Field of the Invention

The present invention relates to a hard disk drive unit and a method of manufacturing the drive unit.

2. Description of the Prior Art

A hard disk drive unit is provided with: a motor mounted on a base member of a housing; and a swing arm (i.e., head arm) which is provided with a magnetic head in its front-end portion. By means of the magnetic head, data is stored in a magnetic disk and retrieved from an arbitrary position of the magnetic disk. On the other hand, hitherto, the base member of the housing of the hard disk drive unit is manufactured by using a casting process or a press working. A casting product 11 of the base member shown in FIG. 7 is manufactured by using a casting process as follows:

(1) an aluminum base member is manufactured by using a die-casting process;

(2) then, gases such as air and the like confined within cavities, stains such as rust and like foreign matters are removed from the base member, the gases being fatal to the hard disk in performance;

(3) further, in order to keep the surface of the base member clean, the surface of the base member is treated with suitable chemicals and/or painted, i.e., coated with suitable films;

(4) the thus treated base member is then machined to be precisely dimensioned; and (5) finally, the thus machined base member is washed out stains to keep itself clean.

However, the above-mentioned casting process of the base member is disadvantageous in that:

(a) the number of the necessary steps of the casting process is too large;

(b) it is necessary to take measures to prevent the cavities from being formed in the casting process;

(c) when the cavities are formed, it is very difficult to completely remove the stains such as oils and the like from the cavities, and, therefore very difficult to keep the base member clean, which makes it necessary to close the cavities in the base member with suitable coatings, or to treat the surface of the base member with suitable chemicals so as to clean the surface and prevent the rust from being produced in the surface;

(d) metallic molds required in the casing process are very expensive; and (e) this increases the manufacturing cost of the base member.

In case of the press working, as shown in FIG. 8, an aluminum base plate 12 is subjected to the press working to form a concave portion 14 and a plurality of holes 15 therein. Then, a frame member 13, which is a sheet metal pressing, is fixedly mounted on each of opposite sides of the base plate 12.

The above-mentioned press working is free from the cavity problem inherent in the casing process, and, therefore advantageous in keeping the surface of the base member clean. However, the press working suffers from the following problems:

(a) although the frame 13 member is a sheet metal pressing, the number of press working steps for manufacturing the frame member 13 is too large since the frame member 13 is very complex in configuration;

(b) an additional step for fixedly mounting the frame member 13 on the base plate 12 is required, in which additional step the frame member 13 must be strictly controlled in mounting position and mounting strength; and (c) this increases the manufacturing cost of a subassembly 12, 13 thus constructed of the base plate 12 and the frame member 13.

SUMMARY OF THE INVENTION

Under such circumstances, the present invention was made. Consequently, it is an object of the present invention to provide a hard disk drive unit and a method of manufacturing the drive unit, which are free from the above-mentioned problems, excellent in precision, reduce the number of manufacturing steps, and further reduce the manufacturing cost thereof.

According to a first aspect of the present invention, the above object of the present invention is accomplished by providing:

A hard disk drive unit comprising:
  a base plate, which assumes a predetermined shape in cross-section so as to form a pair of frame portions in its opposite sides, is made of metal, formed by using an extrusion process, and provided with a concave portion with a central hole through which a motor is mounted on the base plate and a mounting hole through which a swing arm is mounted on the base plate;
  the motor, which is provided with a spindle and has the spindle mounted in the central hole of the concave portion of the base plate in an insertion manner; and
  the swing arm, which has its base portion pivotally supported by a pivot through a bearing, the pivot being mounted on the base plate through the mounting hole.

According to a second aspect of the present invention, the above object of the present invention is accomplished by providing:

A method for manufacturing a hard disk drive unit, comprising the steps of:
  forcing a billet through a die to produce an elongated extruded product having a predetermined cross-sectional shape provided with a pair of frame portions in its opposite sides;
  cutting the extruded product to form a half-finished product having a predetermined length;
  forming the half-finished product into a base plate by subjecting the half-finished product to a press working, the base plate being provided with a concave portion and a hole;
  mounting a magnetic disk drive motor in the concave portion of the base plate; and
  mounting a pivot in the hole of the base plate, the pivot supporting a bearing through which a base portion of a swing arm is pivotally supported.

DESCRIPTION OF THE PREFERRED EMBODIMENTS

Hereinbelow, the present invention will be described in detail with reference to the accompanying drawings, i.e., FIGS. 1 to 6.

Figure 1:
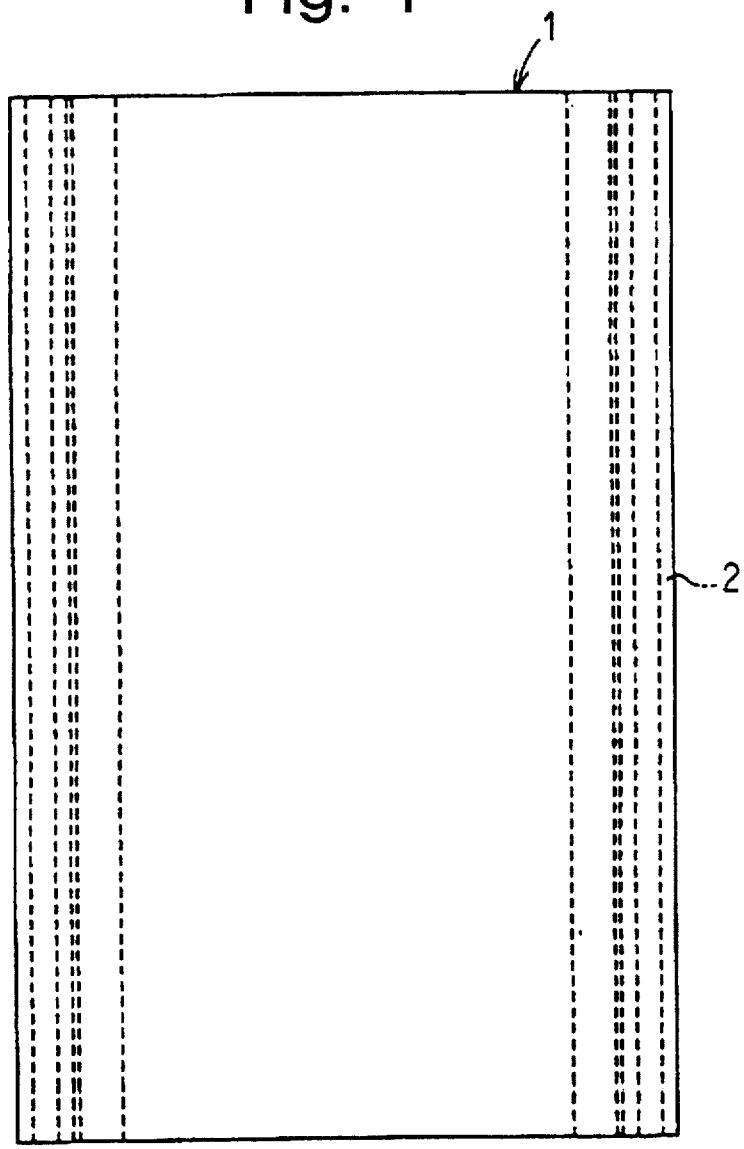
FIG. 1 is a plan view of the half-finished product of the base plate having a predetermined length, produced by using the extrusion process according to the method of the present invention.
Figure 2:
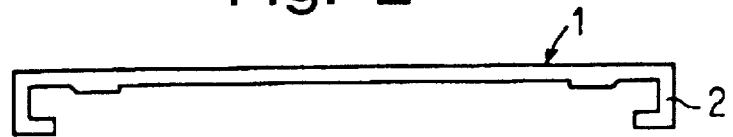
FIG. 2 is a front view of the half-finished product shown in FIG. 1.

According to the present invention, for example, by using an extrusion process, an aluminum billet is forced through a die to produce an elongated extruded product having a predetermined cross-sectional shape provided with a pair of frame portions 2 in its opposite sides. Then, the extruded product thus produced is cut into a predetermined length so that a half-finished product of a base plate 1 having such predetermined length is produced, as shown in FIGS. 1 and 2.

Figure 3:
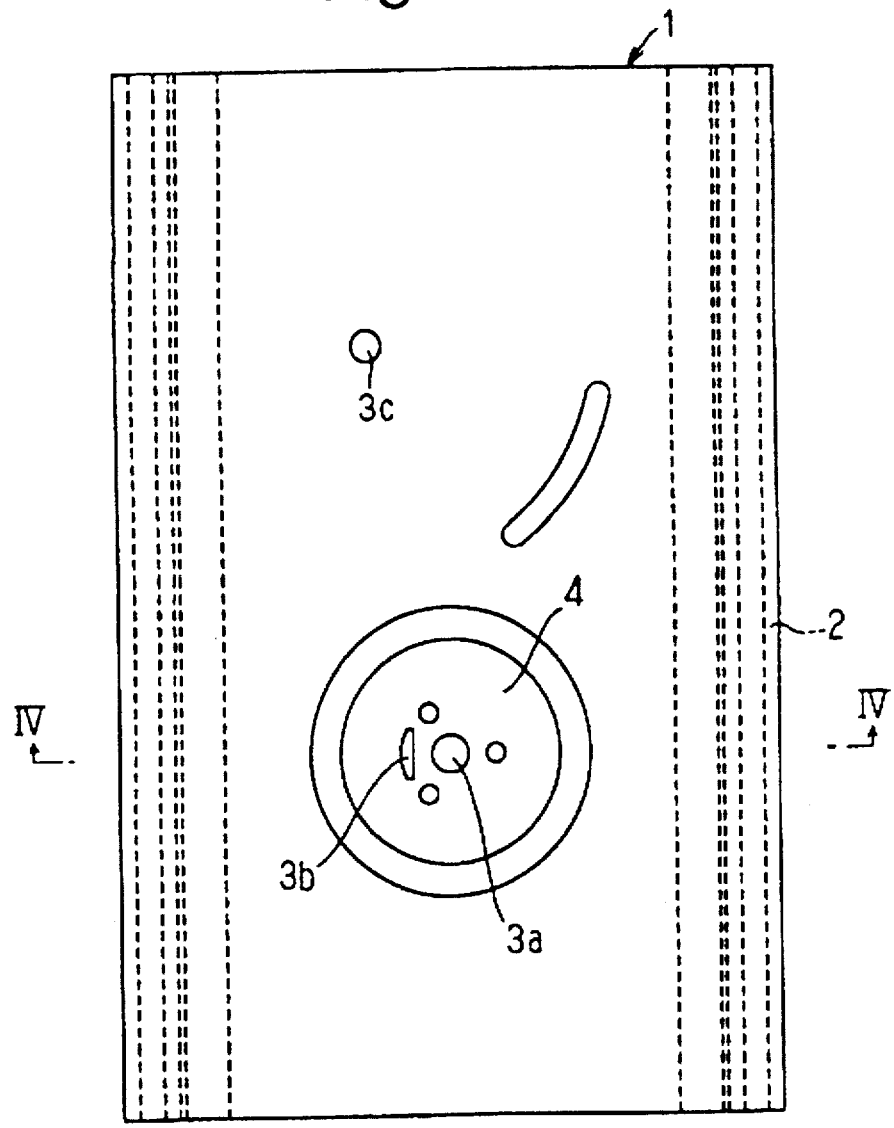
FIG. 3 is a plan view of the base plate shown in FIGS. 1 and 2 after subjected to the press working.
Figure 4:
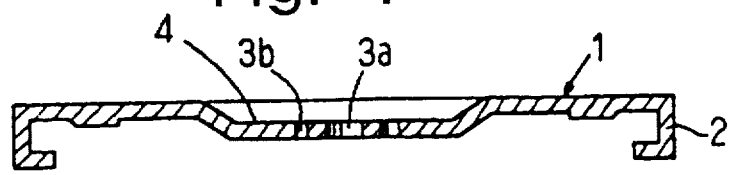
FIG. 4 is a cross-sectional view of the base plate, taken along the line IV—IV of FIG. 3.

After that, as shown in FIGS. 3 and 4, the half-finished product of the base plate 1 is subjected to a press working so as to form: a motor mounting concave portion 4 having a central hole 3a through which a motor M (shown in FIG. 5) is fixedly mounted on the base plate 1; a lead wire hole 3b which permits lead pins or lead wires of the motor M to pass therethrough; and, other necessary holes, for example such as those permitting screws for fixedly mounting the motor M to pass therethrough and like holes.

The base plate 1 is further provided with a swing arm mounting hole 3c through which a base portion of the swing arm 6 is pivotally mounted on the base plate 1.

If necessary, these holes (3a, 3b, 3c) of the base plate 1 are tapped, or precisely finished, or have their cut portions lapped.

Figure 5:
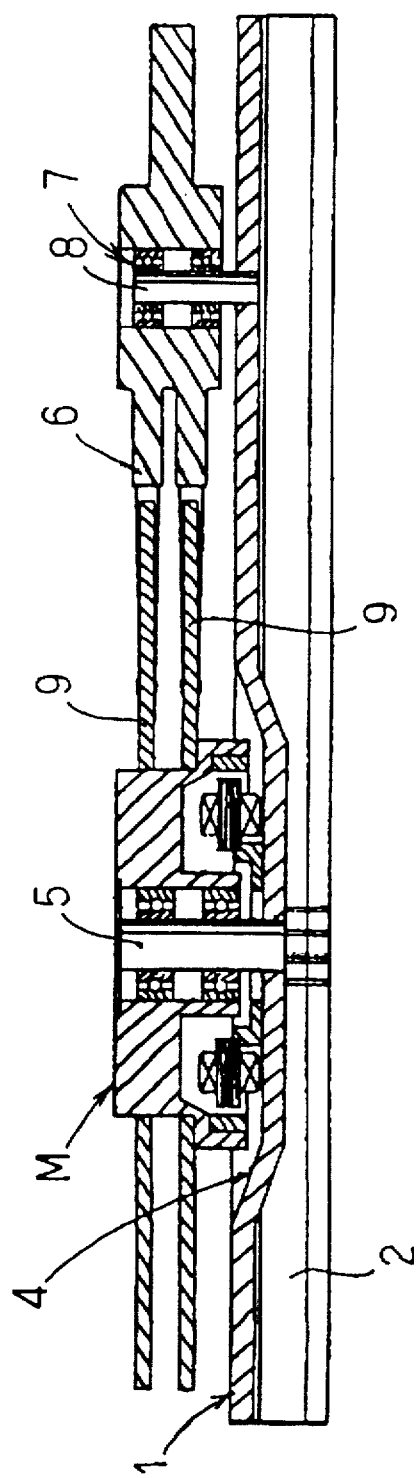
FIG. 5 is a longitudinal sectional view of the hard disk drive unit provided with the motor and the swing arm according to the present invention.
Figure 6:
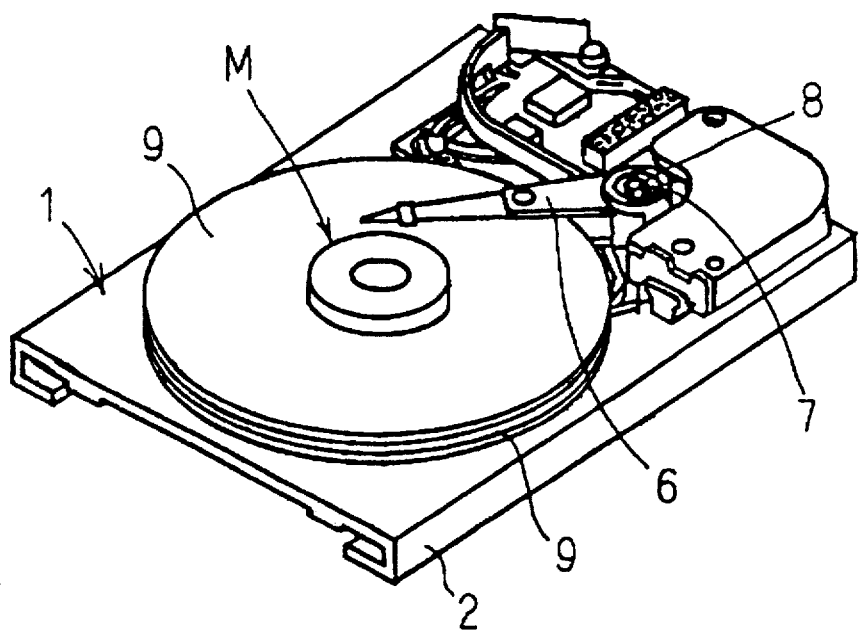
FIG. 6 is a perspective view of the hard disk drive unit shown in FIG. 5.
Figure 7:
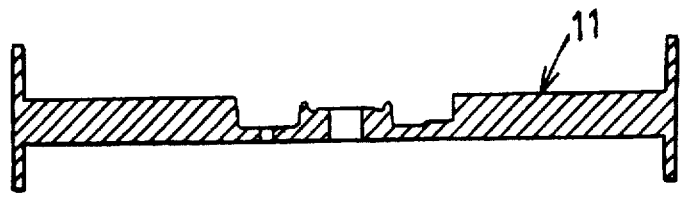
FIG. 7 is a longitudinal sectional view of the conventional base plate manufactured by using the conventional casting process.
Figure 8:
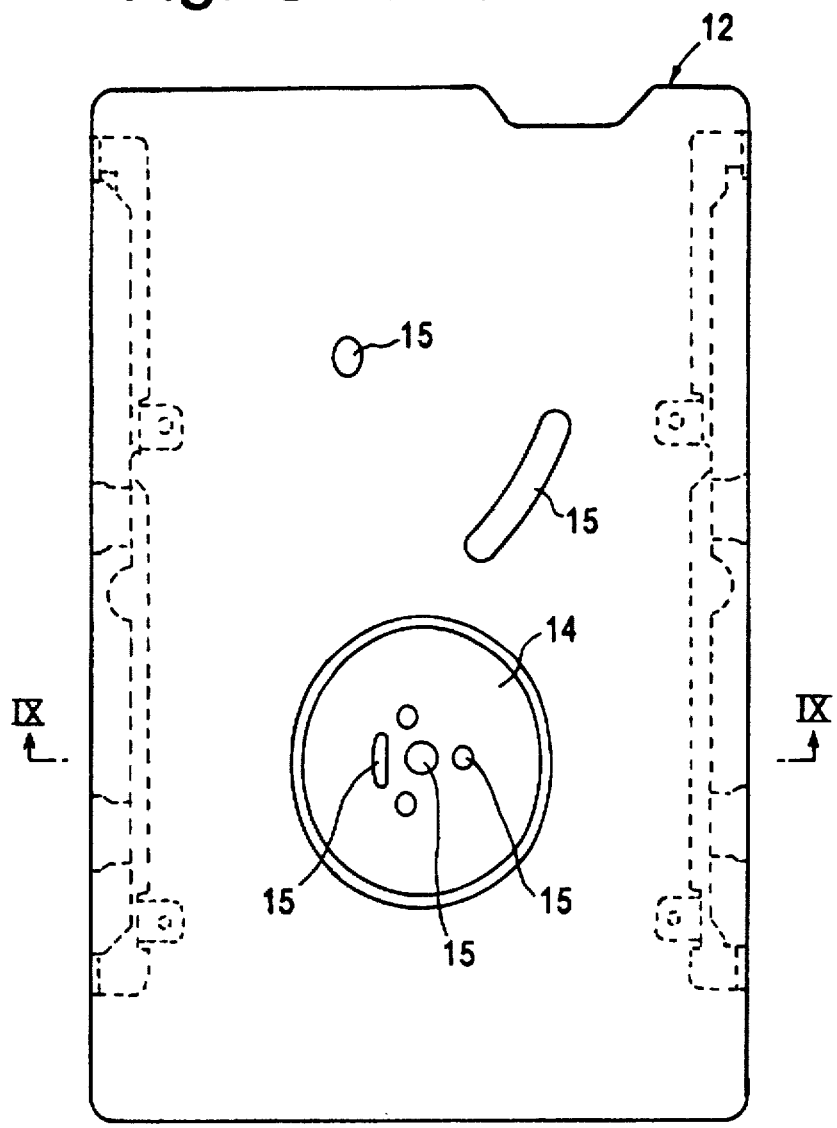
FIG. 8 is a plan view of the conventional base plate manufactured by using the conventional press working.
Figure 9:
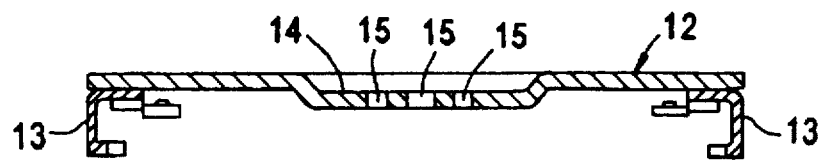
FIG. 9 is a cross-sectional view of the conventional base plate, taken along the line IX—IX of FIG. 8.

Then, a spindle 5 of the motor M for driving a magnetic disk 9 has its end portion fitted in the central hole 3a of the concave portion 4 of the base plate 1 thus finished, and the motor M is fixedly mounted on the concave portion 4 by means of suitable fasteners such as screws and the like as shown in FIG. 5. At this time, the motor M has its lead pins or lead wires pass through the lead wire hole 3b of the base plate 1. On the other hand, the swing arm 6 has its base portion pivotally supported by a pair of ball bearings 7. As is clear from FIG. 5, these bearings 7 are mounted on the pivot 8 so as to be spaced apart from each other and vertically aligned with each other. The pivot 8 has its end portion fitted in the mounting hole 3c of the base plate 1 so that the base portion of the swing arm 6 is pivotally mounted on the base plate 1 through the bearings 7 and the pivot 8.

Further, the present invention realizes a method for manufacturing a hard disk drive unit at low cost. The method of the present invention comprises the steps of:

forcing a billet such as an aluminum billet and like light-metal billets through a die to produce an elongated extruded product having a predetermined cross-sectional shape provided with a pair of the frame portions 2 in its opposite sides;

cutting the extruded product to form a half-finished product having a predetermined length;

forming the half-finished product into the base plate 1 by subjecting the half-finished product to a press working, the base plate 1 being provided with the concave portion 4, lead wire hole 3b and the pivot mounting holes 3c, the concave portion 4 being provided with the central hole 3a;

mounting the magnetic disk drive motor M for driving the magnetic disk 9 in the concave portion 4 of the base plate 1 by having an end portion of the spindle 5 of the motor M fitted in the central hole 3a of the base plate 1;

mounting the pivot 8 in the pivot mounting hole 3c of the base plate 1, the pivot 8 supporting the ball bearings 7 through which the base portion of the swing arm 6 is pivotally supported.

Since the present invention has the above construction, there is no fear that the cavities are formed in the base plate as is in the casting process of the conventional base plate. Consequently, it is easy for the present invention to clean the surface of the base plate or to perform appropriate surface cleaning treatments of the base plate.

Further, the number of press working steps in the method of the present invention for manufacturing the base plate is considerably reduced in comparison with that of the press working steps in the conventional method for manufacturing the base plate. The base plate 1 of the present invention is excellent in precision and in rigidity and manufactured at low cost.

What is claimed is:

1. A method for manufacturing a hard disk drive unit, comprising the steps of:

forming a pair of frame portions Projecting downwardly from opposite edges of an extruded product having a predetermined cross-sectional shape by forcing a billet through a die to produce said elongated extruded product with said pair of frame portions projecting downwardly from opposite edges thereof;

cutting said extruded product to form a half-finished product having a predetermined length;

forming said half-finished product into a base plate by subjecting said half-finished product to a press working, said base plate being provided with a concave portion and a hole;

mounting a magnetic disk drive motor in said concave portion of said base plate; and mounting a pivot in said hole of said base plate, the pivot supporting a bearing through which a base portion of a swing arm is pivotally supported.

2. The method recited in claim 1, wherein said step of forcing said billet to produce said elongated extruded product with said frame portions projecting downwardly therefrom comprises extruding said product to include flange portions projecting from said opposing edges thereof.

3. In a method for manufacturing a hard disk drive unit, the improvement comprising the steps of:

projecting frame portions from opposite edges of a baseplate of said hard disk drive unit by forcing a billet through a die to produce an elongated extruded product having a predetermined cross sectional shape with said frame portions projecting downwardly from opposite edges thereof, and cutting said extruded product having said frame portions projecting therefrom to form a half-finished baseplate having a predetermined length.

4. The improved method recited in claim 3, wherein said step of forcing said billet to produce said elongated extruded product with said frame portions projecting downwardly therefrom comprises extruding said product to include flange portions projecting from said opposing edges thereof.

5. The improved method recited in claim 4, further comprising the step of providing said base plate with a concave portion and a hole by subjecting said half-finished extruded product to a press working.

* * * * *